United States Patent
Lee et al.

(10) Patent No.: US 7,615,114 B2
(45) Date of Patent: Nov. 10, 2009

(54) INK COMPOSITION, INK CARTRIDGE INCLUDING THE SAME AND INK JET RECORDING APPARATUS INCLUDING THE INK CARTRIDGE

(75) Inventors: Jong-in Lee, Suwon-si (KR); In-hye Kim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 303 days.

(21) Appl. No.: 11/641,801

(22) Filed: Dec. 20, 2006

(65) Prior Publication Data

US 2007/0296785 A1 Dec. 27, 2007

(30) Foreign Application Priority Data

Jun. 27, 2006 (KR) .................... 10-2006-0058073

(51) Int. Cl.
C09D 11/00 (2006.01)
C09D 11/02 (2006.01)
B41J 2/01 (2006.01)

(52) U.S. Cl. .................. 106/31.58; 106/31.86; 347/100
(58) Field of Classification Search ............. 106/31.58, 106/31.86; 347/100
See application file for complete search history.

(56) References Cited

U.S. PATENT DOCUMENTS

| 4,694,302 | A | | 9/1987 | Hackleman et al. |
| 5,172,133 | A | | 12/1992 | Suga et al. |
| 5,529,616 | A | | 6/1996 | Prasad |
| 5,623,294 | A | | 4/1997 | Takizawa et al. |
| 5,629,359 | A | | 5/1997 | Peeters et al. |
| 5,980,622 | A | * | 11/1999 | Byers ...................... 106/31.57 |
| 6,019,827 | A | * | 2/2000 | Wickramanayake et al. ....................... 106/31.58 |
| 6,102,996 | A | * | 8/2000 | Parazak ................... 106/31.86 |
| 2006/0036023 | A1 | * | 2/2006 | Kamata et al. .............. 524/556 |
| 2007/0114365 | A1 | * | 5/2007 | Potyrailo et al. ............ 250/221 |
| 2008/0012430 | A1 | * | 1/2008 | Peters et al. ................. 307/131 |

* cited by examiner

Primary Examiner—Helene Klemanski
(74) Attorney, Agent, or Firm—Roylance, Abrams, Berdo & Goodman, L.L.P.

(57) ABSTRACT

An ink composition including a compound having a triester structure that has alternately a hydrophilic group and a hydrophobic group, a coloring agent and a solvent. The compound having the triester structure reduces mobility of the coloring agent and increases adhesion to paper, thereby minimizing bleeding between colors of printed images. The triester compound also improves water fastness of printed images and dry and wet rub fastness to have good colorfastness on paper. In addition, the ink composition improves image quality of printed images and has good long-term storage stability so that it can be widely used in inkjet ink, printing ink, paints, textile printing, paper manufacture, cosmetic manufacture, the ceramic industry and the like.

10 Claims, 2 Drawing Sheets

INK COMPOSITION, INK CARTRIDGE INCLUDING THE SAME AND INK JET RECORDING APPARATUS INCLUDING THE INK CARTRIDGE

CROSS-REFERENCE TO RELATED PATENT APPLICATION

This application claims the benefit under 35 U.S.C. § 119(a) of Korean Patent Application No. 10-2006-0058073, filed on Jun. 27, 2006, in the Korean Intellectual Property Office, the disclosure of which is hereby incorporated by reference in its entirety.

BACKGROUND OF THE INVENTION

1. Field of the Invention

The present invention relates to an ink composition, an ink cartridge including the ink composition and an inkjet recording apparatus including the ink cartridge. More particularly, the invention is directed to an ink composition that exhibits a decreased bleeding between colors of a printed image, and water fastness of a printed image and dry and wet rub fastness are improved, an ink cartridge including the same and an inkjet recording apparatus including the ink cartridge.

2. Description of the Related Art

In general, coloring agents embody their inherent colors by selectively absorbing or reflecting visible light, and are classified as dyestuffs and pigments.

Dyestuffs are used in any material to be dyed, such as fibers, leathers, furs, papers thereby providing considerable fastness to daylight, washing, friction, etc. Pigments are coloring matters in the form of particulates, and are not directly dyed to the surface of the material adhered thereto, by physical means (such as, adhesion, and the like) thereby providing their inherent colors.

Dyestuffs are dissolved in solvents such as water, organic solvents and mixtures thereof. Pigments are generally insoluble in the solvents, and thus it is most important to disperse the pigment particulates homogeneously in a solvent, carrier or vehicle, thereby stably maintaining the dispersed state without re-aggregation.

Dyestuff-type ink is very superior in long-term storage stability, maintaining its homogeneity, and its clear color and brightness. However, dyestuff-type inks are weak in water fastness and light resistance.

Pigment-type ink has high optical density (OD), and superior water fastness and light resistance, and exhibits little bleeding between colors. Pigment-type inks exhibit poor color clearness and weak long-term storage stability compared to dyestuff-type ink. Also, images printed using pigment-type inks have weak dry and wet rub fastnesses.

When printing in colors (multicolor printing) with dyestuffs or pigments, bleeding at interfaces of each color occurs, and thus the clearness of the images is weakened.

To improve rub fastness and color fastness by decreasing mobility of a coloring agent on receptors such as paper, an ink composition for ink-jet printing comprising a pigment, a water-soluble resin and a specific alcohol are used as disclosed in U.S. Pat. Nos. 5,172,133 and 5,529,616.

However, the ink composition for inkjet printing is ejected through nozzles, and thus should have a low viscosity. The amount of polymer binder used in the ink composition is limited. Thus, the amount of polymer binder used cannot bind sufficiently pigment particles to the top of a receptor, thereby providing unsatisfactory rub fastness and color fastness.

As another approach to improve rub fastness and color fastness by decreasing mobility of a coloring agent on receptors, a method using chelating of metal ions (U.S. Pat. No. 4,694,302), a method using a reaction of a cation and an anion (U.S. Pat. No. 5,623,294), and a method using a reaction of polymer (U.S. Pat. No. 5,629,359) have been disclosed. However, the method using chelating of metal ions has difficulty in obtaining long-term storage stability due to a reaction of each ink constituent and metal ions contained in an ink, and the method using a reaction of a cation and an anion also has poor performance due to a reaction of a substrate and the ions as well as a reaction of ink constituents. Also, the method using a reaction of a polymer has an environmental burden due to unreacted monomers, and a further need for a curing apparatus and curing time, in addition to the difficulty in obtaining long-term storage stability.

SUMMARY OF THE INVENTION

The present invention provides an ink composition in which both the quality of a printed image and its long-term storage stability are improved by improving colorfastness such as bleeding resistance, rub fastness, water fastness, and the like.

The present invention also provides an ink cartridge for inkjet printing that includes the ink composition.

The present invention also provides a recording apparatus for inkjet printing that includes the ink cartridge for inkjet printing.

According to an aspect of the present invention, an ink composition is provided that comprises a coloring agent, a solvent and a compound having a triester structure represented by Formula 1 below, a coloring agent and a solvent.

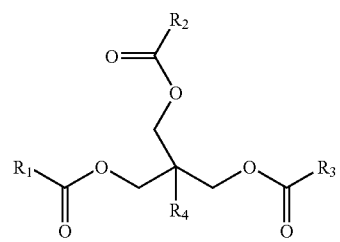

Formula (1)

where each of $R_1$, $R_2$, and $R_3$ is independently a substituted or unsubstituted $C_1$-$C_{20}$ hydroxyalkyl group, a substituted or unsubstituted $C_1$-$C_{20}$ hydroxyalkyloxyalkyl group, or a substituted or unsubstituted $C_1$-$C_{20}$ mercaptoalkyl group;

$R_4$ is a substituted or unsubstituted $C_1$-$C_{20}$ alkyl group, a substituted or unsubstituted $C_1$-$C_{20}$ hydroxyalkyl group, a substituted or unsubstituted $C_1$-$C_{20}$ hydroxyalkyloxyalkyl group, or a substituted or unsubstituted $C_1$-$C_{20}$ mercaptoalkyl group.

According to an embodiment of the present invention, a compound of Formula 1 can be a compound represented by Formulae 2 through 4 below.

Formula (2)

where n is an integer in the range of 1-8.

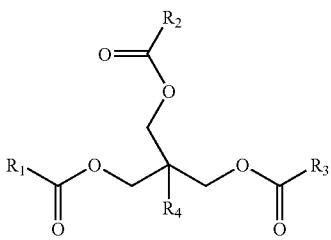

Formula (1)

where each of $R_1$, $R_2$, and $R_3$ is independently a substituted or unsubstituted $C_1$-$C_{20}$ hydroxyalkyl group, a substituted or unsubstituted $C_1$-$C_{20}$ hydroxyalkyloxyalkyl group, or a substituted or unsubstituted $C_1$-$C_{20}$ mercaptoalkyl group;

$R_4$ is a substituted or unsubstituted $C_1$-$C_{20}$ alkyl group, a substituted or unsubstituted $C_1$-$C_{20}$ hydroxyalkyl group, a substituted or unsubstituted $C_1$-$C_{20}$ hydroxyalkyloxyalkyl group, or a substituted or unsubstituted $C_1$-$C_{20}$ mercaptoalkyl group.

A compound having a triester structure represented by Formula 1 included in the ink composition according to the current embodiment of the present invention is a not a linear type but a radial type molecular structure. While printing is performed on paper, a hydrophilic group present in the middle and terminal portions of the triester strongly binds with cellulose, a paper constituent, whereby ink can not permeate into the paper. Therefore, a coloring agent included in the ink composition according to the current embodiment of the present invention can not permeate into paper, and thus high optical density (OD) can be maintained.

In particular, a compound of Formula 1 having a radial structure has a hydrophilic group such as a —O—C(═O)— group and —O— group in a middle portion, and —OH group, —SH group in terminal portion, so that interaction through hydrogen binding with a coloring agent is increased. As a result, the coloring agent can be adhered to a surface of paper, thereby improving durability and bleeding resistance by reducing its mobility on the surface of the paper.

Examples of the compound of Formula 1 include compounds represented by Formulae 2 through 4:

$$C_2H_5C\{CH_2O[CO(CH_2)_5O]_nH\}_3 \quad \text{Formula (2)}$$

where n is an integer in the range of 1-8.

Formula (3)

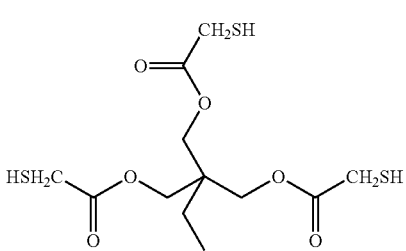

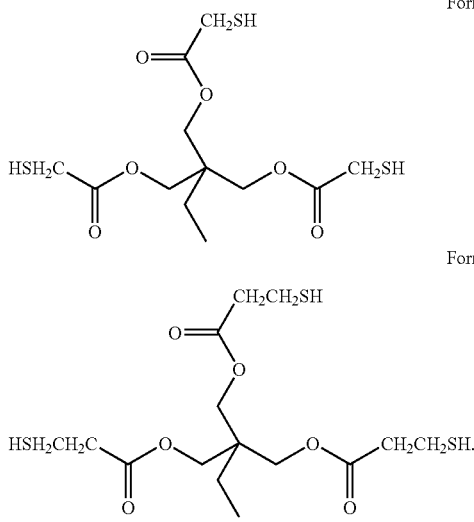

Formula (4)

According to another embodiment of the present invention, a triester compound of Formula 2 can have a number average molecular weight of 200-3,000.

According to another embodiment of the present invention, the ink composition has an amount of the compound of Formula 1 is about 0.1-10 parts by weight based on 1 part by weight of a coloring agent.

According to another aspect of the present invention, an ink cartridge for inkjet printing includes the ink composition.

According to another aspect of the present invention, a recording apparatus for inkjet printing includes the ink cartridge for inkjet printing. The ink composition according to the present invention has superior color fastness, can provide printed images in which bleeding between colors is minimized, and also have good storage stability.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
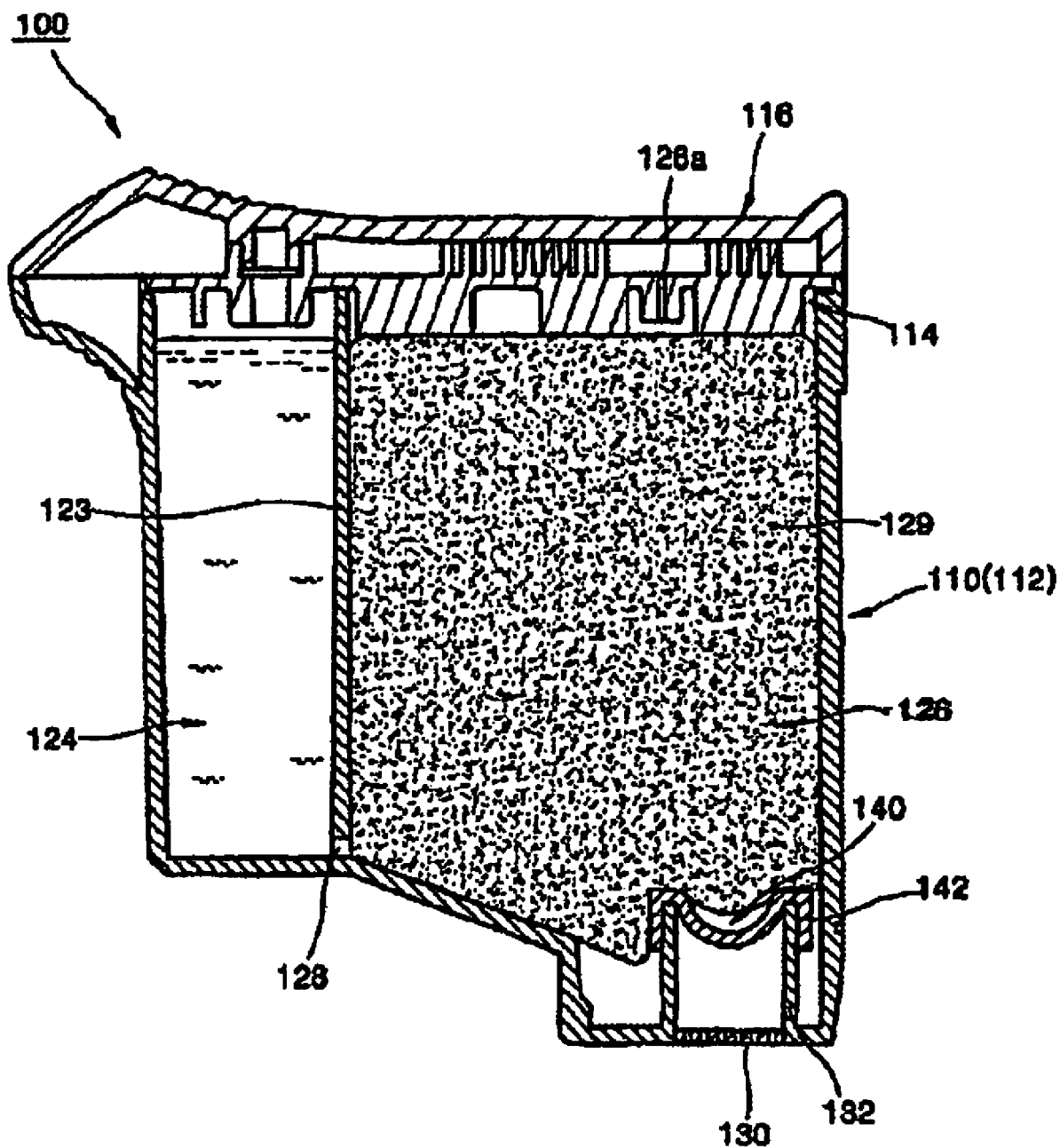
FIG. 1 is a side cross-sectional view of an ink cartridge that includes an ink composition according to an embodiment of the present invention.

Hereinafter, the present invention will be described in more detail by describing embodiments thereof.

According to an embodiment of the present invention, an ink composition comprising a coloring agent, a solvent and a compound having a triester structure represented by Formula 1 below -continued Formula (4)

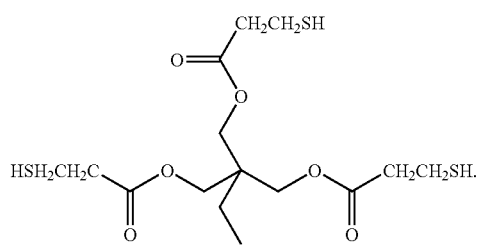

The compound of Formula 2 has a number average molecular weight of 200-3,000, and preferably 300-900. When the number average molecular weight of the compound of Formula 2 is less than 200, the effect described above is difficult to achieve. When the number average molecular weight of the compound of Formula 2 is greater than 3,000, viscosity is rapidly increased. Examples of compounds of Formula 2 include polycaprolactone triol having a number average molecular weight of about 300, polycaprolactone triol having a number average molecular weight of about 500, and a polycaprolactone triol having a number average molecular weight of about 900.

In the ink composition according to the current embodiment of the present invention, the coloring agent can be a self-dispersing pigment, a conventional pigment that is used with a dispersing agent, a direct dye, an acid dye, a dispersing dye, or a reactive dye.

In the ink composition according to the current embodiment of the present invention, has a surface tension of the ink composition is 15-70 dyne/cm at 20° C., and preferably 25-55 dyne/cm. The viscosity of the ink composition is 1.0-20 cps, and preferably 1.5-5.0 cps.

The ink composition including the compound of Formula 1 according to the current embodiment of the present invention can be widely used in inkjet ink, printing ink, paints, textile printing, paper manufacture, cosmetic manufacture, ceramic industry and the like.

The total amount of the compound of Formula 1 used in the current embodiment of the present invention is about 0.1-10 parts by weight based on 1 part by weight of the coloring agent. When the total amount of the compound of Formula 1 is less than 0.1 parts by weight, effects such as durability improvement, and the like are difficult to achieve. When the total amount of the compound of Formula 1 is greater than 10 parts by weight, ink viscosity is increased.

The solvent according to the current embodiment of the present invention can be a mixture of water and an organic solvent.

The organic solvent can be a co-solvent, an amide series compound, or a mixture thereof. The total amount of the organic solvent is about 0.5-20 parts by weight based on 1 part by weight of the coloring agent. When the total amount of the organic solvent is less than 0.5 parts by weight, wetting property and storage stability are not good. When the total amount of the organic solvent is greater than 20 parts by weight, viscosity is rapidly increased.

The co-solvent can be an alcohol such as methyl alcohol, ethyl alcohol, n-propyl alcohol, isopropyl alcohol, n-butyl alcohol, sec-butyl alcohol, t-butyl alcohol or isobutyl alcohol; a polyhydricalcohol such as 1,6-hexanediol, 1,2-hexanediol, ethylene glycol, diethyleneglycol, triethyleneglycol, propyleneglycol, butyleneglycol, 1,4-butandiol, 1,2,4-butantriol, 1,5-pentanediol, 1,2,6-hexanetriol, trimethanolpropane, hexyleneglycol, glycerol, poly (ethylene glycol), or the like; a ketone such as acetone, methylethylketone, diacetone alcohol, or the like; an ester such as ethyl acetate, ethyl lactate, or the like; a lower alkyl ether such as ethylene glycol monomethyl ether, ethylene glycol monoethyl ether, diethylene glycol methyl ether, diethylene glycol ethyl ether, diethylene glycol monobutyl ether, diethylene glycol diethyl ether, triethylene glycol monomethyl ether, triethylene glycol monoethyl ether, or the like; an S-containing compound or mixtures thereof selected from the group consisting of dimethyl sulfoxide, tetramethylene sulfone, and thioglycol, but is not limited thereto.

The amide compounds according to one embodiment of the present invention as a cosolvent can be at least one selected from the group consisting of 2-pyrrolidone, 2-piperidone, N-methyl-pyrrolidone, caprolactam, tetrahydro-2-pyrimidone, 3-methyl-tetrahydro-2-pyrimidone, 2-imidazolidinone, dimethylimidazolidinone, diethylimidazolidinone, butyl urea, 1,3-dimethyl urea, ethyl urea, propyl urea, isopropyl urea and 1,3-diethyl urea.

When the co-solvent and amide compounds according to the current embodiment of the present invention are used together as a solvent, the amount of the amide compounds are 0.1-50 parts by weight based on 1 part by weight of the total amount of the co-solvent.

In the ink composition according to the current embodiment of the present invention, the amount of water is about 1-30 parts by weight based on 1 part by weight of the coloring agent. When the amount of water is less than 1 part by weight, the density of a coloring agent in the ink composition is too high, and thereby viscosity is high. When the amount of water is more than 30 parts by weight, the amount of a coloring agent in the ink composition is too low, and thereby coloring property is not good.

The ink composition according to the current embodiment of the present invention can further include additives such as a wetting agent, a viscosity controller, and the like.

In addition, the ink composition according to the current embodiment of the present invention can further include an acid or a base. At this time, the acid or base increases solubility of the wetting agent with respect to the solvent, and stabilizes the pigment.

The ink composition according to the current embodiment of the present invention as described above can be obtained by adding a coloring agent and the compound of Formula 1 to a solvent and then mixing and stirring the resulting product sufficiently in a stirrer to a homogeneous state, and filtering the resulting product through a filter.

Meanwhile, the use of the ink composition according to an embodiment of the present invention is not particularly limited, and the ink composition can be used in a toner composition, all kinds of printing ink, a coating solution, etc. in addition to a cartridge for printing. Preferably, the ink composition according to the current embodiment of the present invention can be used in an inkjet printer cartridge employing an array head. An inkjet printer employing an array head performs printing at high speed using a plurality of chips unlike a shuttle-type inkjet printer that performs printing while moving one chip, so that processing capacity of a recording apparatus can be increased and printing can be effectively performed when the ink composition according to the current embodiment of the present invention is used. In particular, the ink composition according to the current embodiment of the present invention can be used in an inkjet printer including an array head having more than 10,000 nozzles.

According to an embodiment of the present invention, an ink cartridge for inkjet printing including the ink composition as described above, is provided. Hereinafter, the ink cartridge for inkjet printing according to an embodiment of the present invention will be described in greater detail with reference to FIG. 1.

FIG. 1 is a side cross-sectional view of an ink cartridge 100 including an ink composition according to an embodiment of the present invention.

Referring to FIG. 1, the ink cartridge 100 for inkjet printing according to the current embodiment of the present invention includes an ink cartridge main body 110 including an ink supply tank 112, an inner cover 114 covering a top portion of the ink supply tank 112, an outer cover 116 that is separated by a predetermined gap from the inner cover 114 in order to encapsulate the ink supply tank 112 and the inner cover 114.

The ink supply tank 112 is divided into a first chamber 124 and a second chamber 126 by a vertical barrier wall 123. An ink path 128 between the first chamber 124 and the second chamber 126 is formed in a bottom portion of the vertical barrier wall 123. The first chamber 124 is filled with ink, and the second chamber 126 is filled with a sponge 129 and ink. A vent hole 126a corresponding to the second chamber 126 is formed on the inner cover 114. In addition, a filter 140 is disposed in a lower portion of the second chamber 126, so that ink impurities and fine bubbles are filtered to prevent nozzles 130 of a print head from being blocked. A hook 142 is formed in the edge of the filter 140 and is disposed on a top portion of a standpipe 132. The ink composition according to an embodiment of the present invention is stored in the first chamber 124 and the second chamber 126, and then when a recording apparatus is operated, the ink composition passes through the filter 140 and nozzles 130 of a print head, and thereby ink is ejected from the ink supply tank 112 onto a printing media in a liquid-drop form.

In addition, according to an embodiment of the present invention, a recording apparatus for inkjet printing including the ink cartridge for inkjet printing is provided. Hereinafter, the recording apparatus for inkjet printing according to an embodiment of the present invention will be described in more detail with reference to FIG. 2.

Figure 2:
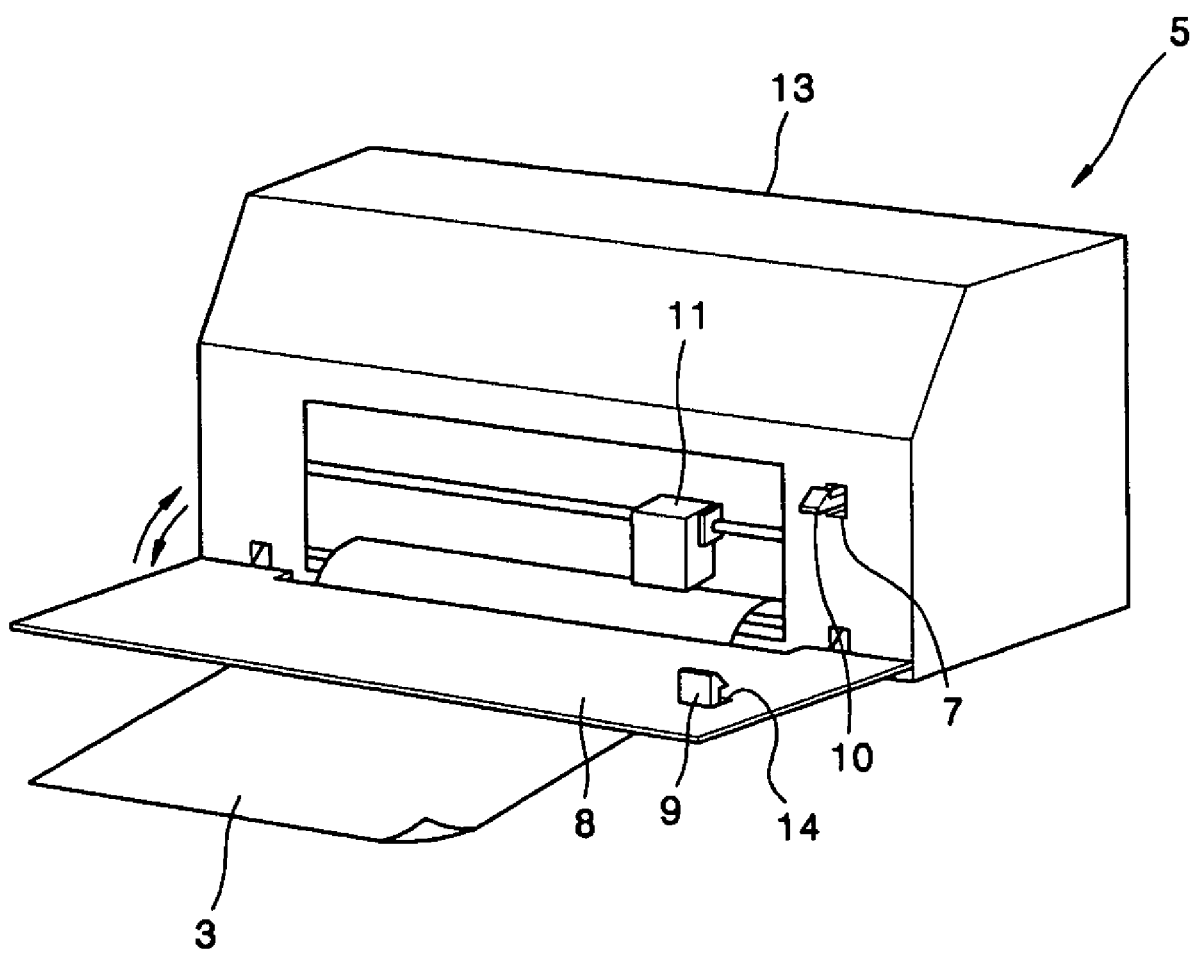
FIG. 2 is a perspective view of an inkjet recording apparatus including the ink cartridge having an ink composition, according to an embodiment of the present invention.

FIG. 2 is a perspective view of an inkjet recording apparatus 5 including an ink cartridge 11 having an ink composition according to an embodiment of the present invention.

Referring to FIG. 2, the ink cartridge 11 includes a black ink composition containing a compound of Formula 1, a coloring agent and a solvent. A cover 8 of the inkjet recording apparatus 5 is connected to a main body 13 of the recording apparatus 5 by a hinge. An engaging portion of a movable latch 10 protrudes through a hole 7. The movable latch 10 engages with a fixed latch 9. The fixed latch 9 is coupled to an inner side of the cover 8 when the cover 8 of the inkjet recording apparatus 5 is closed. The fixed latch 9 on cover 8 of the inkjet recording apparatus 5 has a recess 14 in a region corresponding to the engaging portion of the movable latch 10 protruding through the hole 7. The ink cartridge 11 is positioned such that ink can be ejected onto paper 3 that passes under the ink cartridge 11.

As described above, the present invention provides an ink composition, an ink cartridge for inkjet printing including the ink composition, and a recording apparatus for inkjet printing including the ink cartridge. The ink composition according to the present invention minimizes bleeding between colors of printed images, and has good rub fastness, good color fastness and good storage stability.

Hereinafter, the present invention will be described in greater detail with reference to the following examples. The following examples are for illustrative purposes only and are not intended to limit the scope of the invention.

EXAMPLE

Coloring agents used in examples below are as follows.
<Coloring Agents>
Black 1: Raven 5250, manufactured by Columbian Co.
Black 2: Regal 330, manufactured by Cabot Co.
Cyan: Direct Turquoise Blue, manufactured by Clariant
Magenta: Basacid Rot 495, manufactured by BASF
Yellow: Yellow GGN, manufactured by Spectra
<Organic Solvents>
EG: Ethylene Glycol
DEG: Diethylene Glycol
Gly: Glycerin
1,2,6-hex: 1,2,6-hexanetriol
DEGMBE: Diethyleneglycol Monobutyl Ether
<Amide Compounds>
2-P: 2-pyrrolidone
NMP: N-methyl-2-pyrrolidone
Cyclo-P: Cyclohexyl pyrrolidone
<Compounds of Formula 1>
TS-1: Polycaprolactone triol, number average molecular weight of about 300
TS-2: Polycaprolactone triol, number average molecular weight of about 500
TS-3: Polycaprolactone triol, number average molecular weight of about 900
TS-4: Trimethylolpropane tris (2-mercaptoacetate)
TS-5: Trimethylolpropane tris (3-mercaptopropionate)

By using the coloring agents above, compounds of Formula 1 and organic solvents above, an ink sample was prepared as follows.

Each constituent according to compositions of Table 1 below was added to a 250 ml beaker and then water was added to obtain a product having a weight of 100 g. Thereafter, the resulting product was stirred at 700 rpm in a stirrer for over 30 minutes to a homogeneous state. Then the resulting product was filtered through a 0.45 μm filter to obtain an ink composition.

TABLE 1

| | Sample | Coloring agent (g) | Organic solvent (g) + Compound of Formula 1 (g) |
|---|---|---|---|
| Example 1 | Ink 1 | Black 1, (4) | EG (8), DEG (6), TS-1 (20) |
| Example 2 | Ink 2 | Black 2, (4) | Gly (7), DEG (5), TS-2 (12) |
| Example 3 | Ink 3 | Cyan, (4) | EG (10), DEGMBE (4), TS-3 (4), 2-P (0.4) |
| Example 4 | Ink 4 | Magenta, (4) | 1,2,6-Hex (10), DEG (6), NMP (4), TS-4 (8) |
| Example 5 | Ink 5 | Yellow, (4) | 1,2,6-Hex (9), Gly (5), Cyclo-P (6), TS-5 (4) |

TABLE 1-continued

| | Sample | Coloring agent (g) | Organic solvent (g) + Compound of Formula 1 (g) |
|---|---|---|---|
| Comparative Example 1 | Ink 6 | Black 1, (4) | EG (8), DEG (6) |
| Comparative Example 2 | Ink 7 | Black 2, (4) | Gly (7), DEG (5) |
| Comparative Example 3 | Ink 8 | Cyan, (4) | EG (10), DEGMBE (4), 2-P (6) |
| Comparative Example 4 | Ink 9 | Magenta, (4) | 1,2,6-Hex (10), DEG (6), NMP (4) |
| Comparative Example 5 | Ink 10 | Yellow, (4) | 1,2,6-Hex (9), Gly (5), Cyclo-P (6) |

Experimental Example 1

Test of Storage Stability of Cartridge

The ink compositions prepared according to Examples 1 through 5 and Comparative Examples 1 through 5 were filled into a Samsung ink cartridge at room temperature (25° C.), and at a low temperature (−5° C.) for two weeks, and then the degree by which a nozzle was blocked such that printing could not be performed was evaluated as follows. The results are shown in Table 2 below.
 ⊚: 5% or less of the existing nozzle was blocked
 ○: 6~10% of the existing nozzle was blocked
 X: 11~20% of the existing nozzle was blocked
 XX: 21% or more of the existing nozzle was blocked Experimental Example 2

Test of Rub Fastness

The ink compositions prepared according to Examples 1-5 and Comparative Examples 1-5 were refilled into an ink cartridge M-50 (manufactured by Samsung Co.), and then a 2×10 cm bar picture was printed using a printer (MJC-2400C, manufactured by Samsung Co.). The resulting image was dried for 24 hours, and then when rubbing the image 5 times using a tester, optical density (OD) of the transferred image of the bar picture was compared to optical density (OD) of the image of the bar picture before rubbing and expressed as a percentage. The results were evaluated as follows and are shown in Table 2 below.
 A=(OD of transferred image/OD of original bar picture)×100(%)
 ⊚: A<15
 ○: 15≦A<30
 X: 30≦A≦45
 XX: A>45

Experimental Example 3

Test of Bleeding Resistance

The ink compositions prepared according to Examples 1-5 and Comparative Examples 1-5 were refilled into an ink cartridge M-50 (manufactured by Samsung Co.), and then a test pattern was printed with colored ink using a printer (MJC-2400C, manufactured by Samsung Co.). After 30 minutes, the position of a dot line at which color mixing occurred based on borderline between two adjacent colors was measured with a microscope (evaluation standard: as disclosed in U.S. Pat. No. 5,854,307, which is incorporated by reference in its entirety)

The degree of bleeding resistance was evaluated based on the following.
 5: Color mixing did not occur in the borderline.
 4: Color mixing corresponding to a width of diameter of 1 dot occurred.
 3: Color mixing corresponding to a width of 2 dot diameters occurred.
 2: Color mixing corresponding to a width of 3 dot diameters occurred.
 1: Color mixing corresponding to a width of 4 or more dot diameters (based on 600 dpi, 1 dot diameter=100 µm) occurred.

Experimental Example 4

Test of Water Fastness

The ink compositions prepared according to Examples 1-5 and Comparative Examples 1-5 were refilled into an ink cartridge M-50 (manufactured by Samsung Co.), and then a 2×10 cm bar picture was printed using a printer (MJC-2400C, manufactured by Samsung Co.). After 5 minutes, 5 droplets of water were dropped to the resulting image. The image was dried for 24 hours, and then OD decreased after water flowed down was compared to OD of the original bar picture and expressed as a percentage. The results were evaluated as follows and are shown in Table 5 below.
 A=(OD of image after water flowed down/OD of original bar picture)×100(%)
 ⊚: A>95
 ○: 90≦A<95
 X: 75≦A<90
 XX: A<75

TABLE 2

| | Cartridge storage stability | Rub fastness | Bleeding resistance | Water fastness |
|---|---|---|---|---|
| Example 1 | ⊚ | ⊚ | 5 | ○ |
| Example 2 | ⊚ | ○ | 5 | ⊚ |
| Example 3 | ○ | ⊚ | 5 | ○ |
| Example 4 | ⊚ | ⊚ | 5 | ⊚ |
| Example 5 | ⊚ | ⊚ | 4 | □ |
| Comparative Example 1 | X | X | 2 | XX |
| Comparative Example 2 | X | X | 2 | X |

TABLE 2-continued

|  | Cartridge storage stability | Rub fastness | Bleeding resistance | Water fastness |
|---|---|---|---|---|
| Comparative Example 3 | ○ | XX | 3 | X |
| Comparative Example 4 | X | X | 2 | XX |
| Comparative Example 5 | X | X | 2 | XX |

The compound having the triester structure of Formula 1 included in the ink composition according to the present invention reduces mobility of the coloring agent and increases adhesion to paper, thereby minimizing bleeding between colors of printed images, and improves water fastness of printed images and dry and wet rub fastness, thereby having good colorfastness on paper. In addition, the ink composition of the present invention improves image quality of printed images and has good long-term storage stability so that it can be widely used in inkjet ink, printing ink, paints, textile printing, paper manufacture, cosmetic manufacture, the ceramic industry and the like.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An ink composition comprising a coloring agent, a solvent and a compound having a triester structure represented by Formula 1

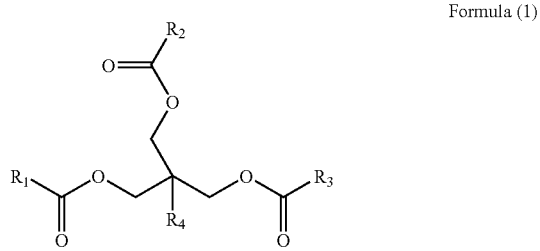

Formula (1)

where $R_1$, $R_2$, and $R_3$ are a substituted or unsubstituted $C_1$-$C_{10}$ mercaptoalkyl group;

$R_4$ is a substituted or unsubstituted $C_1$-$C_{20}$ alkyl group, a substituted or unsubstituted $C_1$-$C_{20}$ hydroxyalkyl group, a substituted or unsubstituted $C_1$-$C_{20}$ hydroxyalkyloxyalkyl group, or a substituted or unsubstituted $C_1$-$C_{20}$ mercaptoalkyl group.

2. The ink composition of claim 1, wherein the compound of Formula 1 is a compound represented by Formulae 3 or 4 below:

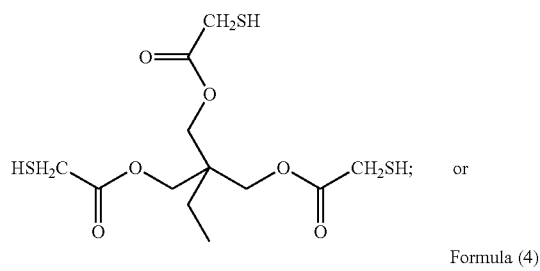

Formula (3)

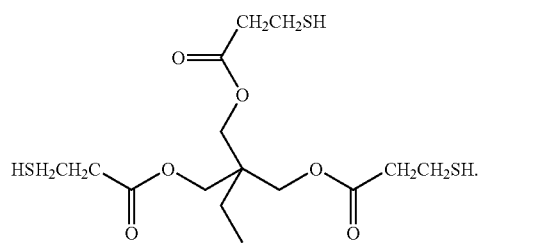

Formula (4)

3. The ink composition of claim 1, wherein an amount of the triester compound of Formula 1 is about 0.1-10 parts by weight based on 1 part by weight of the coloring agent.

4. The ink composition of claim 1, wherein the solvent is a mixture of water and an organic solvent.

5. The ink composition of claim 4, wherein the amount of the water is about 1-30 parts by weight based on 1 part by weight of the coloring agent.

6. The ink composition of claim 1, wherein the ink composition has a surface tension of 15-70 dyne/cm at 20° C., and a viscosity of 1-20 cP.

7. An ink cartridge containing the ink composition according to claim 1.

8. An inkjet recording apparatus comprising the ink cartridge according to claim 7.

9. The inkjet recording apparatus of claim 8, wherein the inkjet recording apparatus is used in an inkjet printer comprising an array head having 10,000 or more nozzles.

10. The ink composition of claim 1, wherein said coloring agent is selected from the group consisting of a self-dispersing pigment, a pigment and dispersing agent mixture, a direct dye, an acid dye, a dispersing dye and a reactive dye.

* * * * *